United States Patent
Craft et al.

[19]

[11] Patent Number: 6,015,444
[45] Date of Patent: Jan. 18, 2000

[54] APPARATUS AND SYSTEM FOR VENTING A TRANSMISSION

[75] Inventors: Robert B. Craft, Ceresco; John S. Steurer, Kalamazoo; Paul R. Peterson, Scotts, all of Mich.

[73] Assignee: Eaton Corporation, Cleveland, Ohio

[21] Appl. No.: 09/032,802

[22] Filed: Feb. 27, 1998

[51] Int. Cl.$^7$ .................................................. B01D 46/00
[52] U.S. Cl. ........................ 55/320; 55/385.3; 55/385.4; 55/505; 55/510; 74/606 R; 220/371; 220/374
[58] Field of Search ............................. 55/320, 327, 329, 55/385.1, 385.4, 490, 510, 504, 505, 385.3; 74/606 R; 220/371, 373, 374

[56] References Cited

U.S. PATENT DOCUMENTS

| | | | |
|---|---|---|---|
| 1,402,348 | 1/1922 | Garner | 55/505 |
| 1,639,670 | 8/1927 | Rydner | 55/505 |
| 1,784,067 | 12/1930 | Holtson | 55/505 |
| 2,493,861 | 1/1950 | Duran | 55/504 |
| 2,532,888 | 12/1950 | Brown | 55/510 |
| 2,539,378 | 1/1951 | Stootman | 55/505 |
| 2,675,886 | 4/1954 | McMullen | 55/510 |
| 2,784,801 | 3/1957 | Lunde | 55/505 |
| 3,130,025 | 4/1964 | Bowden et al. | 55/503 |
| 3,160,487 | 12/1964 | Risse et al. | 220/371 |
| 3,167,416 | 1/1965 | Humbert, Jr. et al. | 55/510 |
| 3,218,785 | 11/1965 | Tietz | 55/510 |
| 3,266,229 | 8/1966 | Witkowski | 55/510 |
| 3,271,938 | 9/1966 | Rest et al. | 55/510 |
| 3,290,869 | 12/1966 | Lentz et al. | 55/510 |
| 3,422,982 | 1/1969 | Terwoerds et al. . | |
| 3,451,584 | 6/1969 | Degaetano | 55/510 |
| 3,622,033 | 11/1971 | Butler et al. | 55/510 |
| 3,686,973 | 8/1972 | Davison, Jr. et al. . | |
| 4,147,096 | 4/1979 | Caswell | 220/374 |
| 4,151,761 | 5/1979 | Nishikawa et al. . | |
| 4,175,671 | 11/1979 | Holl et al. | 220/371 |
| 4,392,584 | 7/1983 | Bauer | 220/374 |
| 4,401,093 | 8/1983 | Gates, Jr. et al. | 55/385.4 |
| 4,446,755 | 5/1984 | Takahashi . | |

(List continued on next page.)

FOREIGN PATENT DOCUMENTS

| | | | |
|---|---|---|---|
| 3241535 | 5/1984 | Germany | 55/385.4 |
| 3425215 | 1/1985 | Germany | 55/385.4 |

*Primary Examiner*—Duane S. Smith
*Attorney, Agent, or Firm*—Brooks & Kushman P.C.

[57] ABSTRACT

An apparatus and system for venting a transmission (10) is disclosed which provides a transmission breather (12) which allows pressure equalization between the interior and exterior of the transmission while reducing or eliminating fluid expulsion from the transmission. The breather includes a standpipe (18), a bowl (20) having a first end (70) secured to the standpipe and at least one aperture (80), a shroud (22) secured to the standpipe, and a filter (90) disposed between the bowl and the standpipe. The standpipe has a first end (30), a second end (32) and an intermediate portion (34) extending axially between the first and second ends. The second end of the standpipe has at least one surface (46) for transmitting torque to the standpipe to enable the breather to be top drivable to facilitate installation and removal of the breather with the transmission. The intermediate portion has an axially extending central passage (60) and at least one radially extending passage (64). The shroud restricts the entry of external contaminants into the transmission through the breather. Air, transmission fluid, mist, and vapor flow through the passages of the standpipe and through the filter which captures the fluid, mist and vapor while allowing filtered air to be vented to the environment through the at least one aperture. The filter facilitates coalescence of the transmission fluid which is returned to the transmission via the passages in the standpipe.

19 Claims, 2 Drawing Sheets

U.S. PATENT DOCUMENTS

| | | | |
|---|---|---|---|
| 4,476,995 | 10/1984 | Bellino et al. | 220/371 |
| 4,554,844 | 11/1985 | Hamano . | |
| 4,595,118 | 6/1986 | Azuma et al. . | |
| 4,794,942 | 1/1989 | Yasuda et al. . | |
| 4,987,795 | 1/1991 | Nguyen . | |
| 5,024,345 | 6/1991 | Deweerdt . | |
| 5,129,422 | 7/1992 | Davison, Jr. et al. | 74/606 R |
| 5,275,636 | 1/1994 | Dudley et al. . | |
| 5,341,951 | 8/1994 | Springston . | |
| 5,348,570 | 9/1994 | Ruppert, Jr. et al. | 55/504 |
| 5,404,964 | 4/1995 | Zinsmeyer et al. . | |
| 5,509,949 | 4/1996 | Gluys et al. . | |
| 5,694,817 | 12/1997 | Reid . | |
| 5,914,415 | 6/1999 | Tago | 55/385.4 |

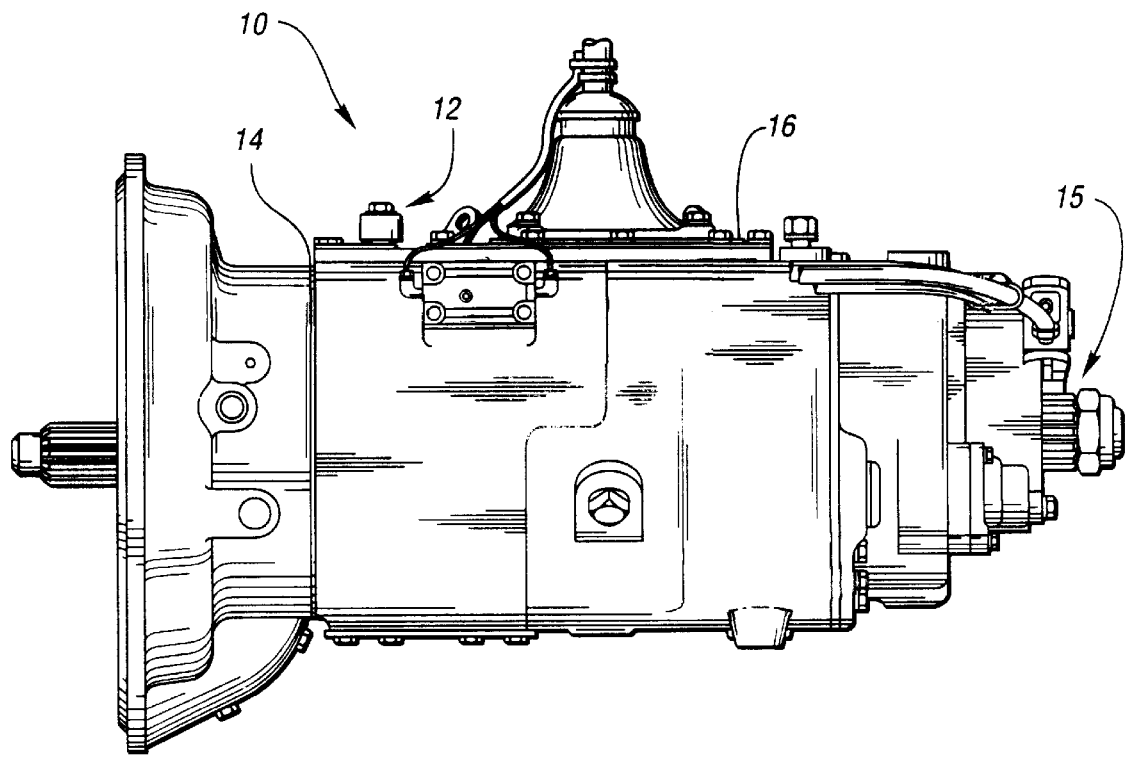
Fig. 1
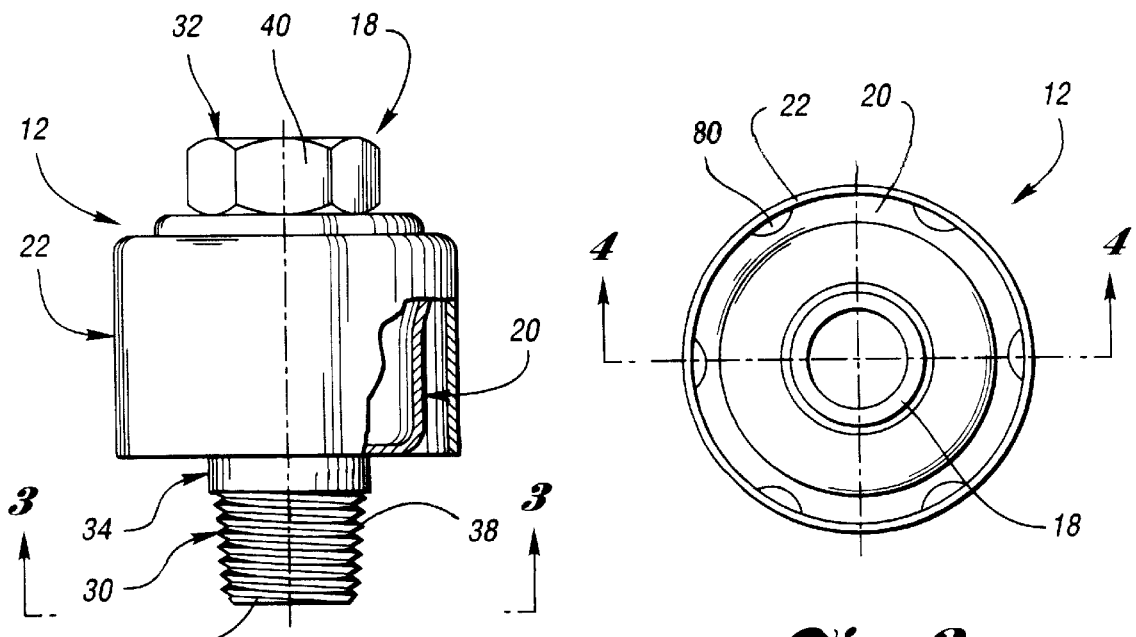
Fig. 2
Fig. 3

APPARATUS AND SYSTEM FOR VENTING A TRANSMISSION

TECHNICAL FIELD

The present invention relates to an apparatus and a system for venting a vehicular transmission.

BACKGROUND ART

Multiple ratio mechanical transmissions, whether manual, automatic, or semi-automatic, utilize a fluid disposed within the transmission to accomplish various functions. For example, manual mechanical transmissions use a fluid for lubrication of rotating and meshing parts. Automatic transmissions use a fluid for generating and transferring hydrodynamic power in addition to providing lubrication for rotating parts. The specific formulation and properties of a transmission fluid are generally adapted to the particular application. However, regardless of the application, the various types of transmission fluids have some common properties.

Since vehicles, such as tractor semi-trailer trucks, are often subjected to extreme temperature variations, it is desirable for a transmission fluid to function somewhat consistently over the vehicle operating range. In addition to variations in ambient operating temperatures, a transmission fluid is also subjected to heat generated by friction produced by the numerous rotating components. This temperature fluctuation is manifested as a change in viscosity of the transmission fluid. The change in viscosity may pose a number of challenges in designing a mechanical transmission for consistent performance over a typical operating range.

Ambient and operating temperature variations also result in expansion and contraction of transmission fluid, which results in fluctuations in the transmission fluid volume. This results in a pressure differential between the interior of the transmission and the exterior which is subjected to atmospheric pressure. Such pressure differences could cause failure of the transmission seals. Thus, it is desirable to control the pressure differential between the interior and exterior of a transmission.

A pressure differential may also be created by changes in atmospheric pressure as a vehicle travels from a lower elevation to a higher elevation. Although this change may seem insignificant, atmospheric pressure can vary significantly from elevations ranging from below sea level to those exceeding 10,000 feet.

Thus, a number of transmission manufacturers have added a vent or breather to their transmissions to equalize interior and exterior pressures. For many applications, a small vent tube which is strategically positioned provides this function. However, many of the prior art devices allow bridging of the transmission fluid which results in unnecessary fluid expulsion. Bridging occurs when the transmission fluid spans the opening of the vent or breather due to the cohesion tension of a viscous fluid. As the transmission warms up, the pressure increases within the transmission creating a bubble within the tube or breather which forces the fluid to be expelled unnecessarily from the transmission.

Due to the nature of the breather's function, breathers are usually positioned on a top, or upwardly facing, surface of the transmission. This is a relatively precarious position which leaves the breathers vulnerable to impacts, especially downwardly directed impacts, which could sufficiently impair the structural integrity of the breather rendering the breathers less effective or inoperable for their intended purposes. Such exemplary impacts could occur by a mechanic or driver inadvertently stepping on the top of the breather, or accidently striking the breather with a tool, while working on a component under the hood or cab of a tractor semi-trailer truck.

Prior art breathers typically have at least one opening to help equalize interior and exterior pressures. This opening is essentially unshielded and can enable external contaminants such as water, dirt and other debris to easily enter the transmission through the breather. A typical prior art breather has a shaft having a hexagonal nut-like member fixed at about the midpoint lengthwise of the shaft. Installation of these types of breathers typically requires the use of a non-top drivable tool, causing the installation of the breather to be relatively time consuming and difficult.

Thus, it is desirable to provide a transmission breather which provides pressure equalization while reducing or eliminating unnecessary transmission fluid expulsion from the breather during normal operation of the transmission without allowing easy entry of external contaminants into the transmission. It is also desirable to provide a breather which reduces or eliminates fluid escape in the form of vapor. It is also desirable to provide a breather which comprises only a few parts, which can be easily manufactured and which can be easily installed in the transmission with a top-drivable tool, such as a socket wrench or a screwdriver. It is also desirable to provide a breather which is designed to withstand the types of impacts which could occur over the lifetime of the breather and which is corrosion resistant.

DISCLOSURE OF THE INVENTION

Thus, it is an object of the present invention to provide a transmission breather which provides pressure equalization while reducing unnecessary fluid expulsion during normal operation without allowing easy entry of external contaminants into the transmission.

An additional object of the present invention is to provide a venting system for a transmission which resists bridging of transmission fluid so as to reduce or eliminate fluid expulsion from the transmission.

Another object of the present invention is to provide a transmission breather which reduces the escape of transmission fluid vapor from the transmission.

A still further object of the present invention is to provide a transmission breather which captures and coalesces transmission fluid vapor and mist while providing return of the fluid to the transmission.

Yet another object of the present invention is to provide a method for venting a transmission which reduces unnecessary fluid expulsion.

Still yet another object of the present invention is to provide an easily manufacturable breather comprising only a few parts which can be installed easily and quickly in the transmission which is sufficiently durable and resistant to corrosion.

In carrying out the above objects and other objects and features of the present invention, a transmission breather is provided which includes a standpipe having a first end, a second end and an intermediate portion extending axially between the first and second ends. The first end of the standpipe has a threaded region adapted for engagement with the transmission and sized to resist formation of a film of the lubricating fluid thereacross. The second end of the standpipe has at least one surface for transmitting torque to the standpipe. The intermediate portion has an axially extending passage and at least one radially extending passage. The breather includes a bowl, adapted to receive a filter, having a first end secured to the standpipe and having at least one aperture A shroud is secured to the standpipe and a filter is disposed between the bowl and the standpipe.

A method is also provided for venting a transmission while reducing fluid and vapor expulsion.

The above objects and other objects, features, and advantages of the present invention will be readily appreciated by one of ordinary skill in this art from the following detailed description of the best mode for carrying out the invention when taken in connection with the accompanying drawings.

BRIEF DESCRIPTION OF THE DRAWINGS

FIG. 1 is perspective view of a transmission including a breather according to the present invention;

FIG. 2 is a partially sectioned side elevational view of a transmission breather according to the present invention;

FIG. 3 is a sectional view taken along line 2—2 of FIG. 2; and

BEST MODE FOR CARRYING OUT THE INVENTION

Figure 4:
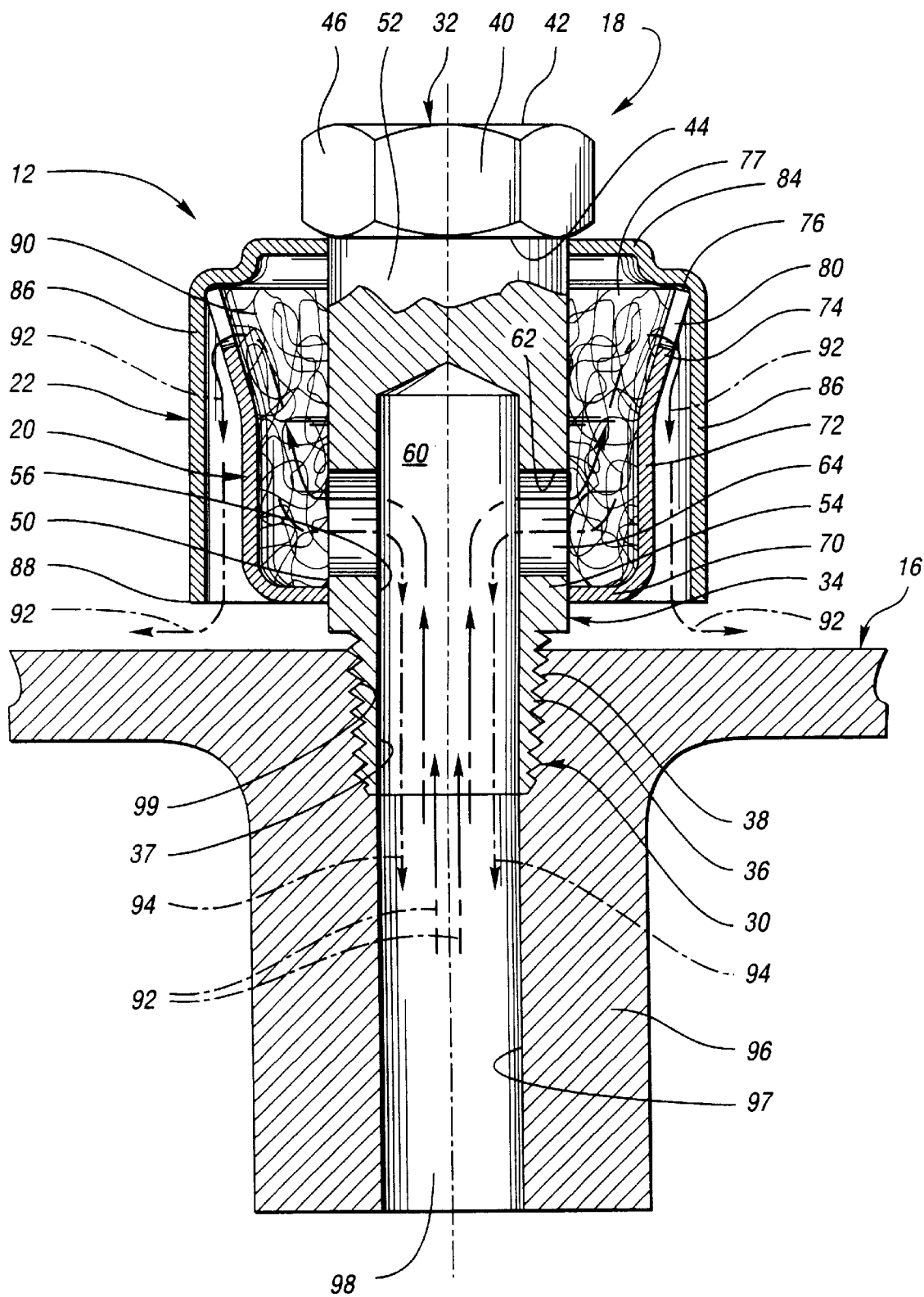
FIG. 4 is a sectional view of FIG. 3 taken along section line 4—4 of an installed transmission breather illustrating a shift bar housing protrusion according to the present invention.

Referring now to FIG. 1, a multiple ratio transmission, indicated generally by reference numeral 10, includes a transmission breather 12. Transmission 10 contains any one of a variety of well known lubricating fluids (not shown), generally referred to as transmission fluid. As is also well known, transmission 10 includes a number of different seals to retain the fluid within the transmission. The seals include stationary seals 14 as well as rotary seals 15. Preferably, breather 12 is positioned substantially vertically on a top surface of transmission 10 (as positioned when mounted in a vehicle).

In a preferred embodiment, breather 12 is located on the top surface of a shift bar housing 16. Shift bar housing 16 includes an annular protrusion 96 (best illustrated in FIG. 4) which is disposed within transmission 10. Annular protrusion 96 has an interior threaded region 99 for engagement with the breather 12 and a cylindrical inner surface 97 defining a central passage 98 as explained in greater detail below. The position for the breather 12 is also preferably chosen relative to internal transmission components so as to limit the exposure of the breather 12 to excessive amounts of transmission fluid. Although a manual mechanical transmission 10 is illustrated in FIG. 1, the present invention is equally applicable to a variety of transmissions employing various modes of actuation, such as automatic transmissions and semi-automatic transmissions.

Referring now to FIG. 2, a transmission breather 12 according to the present invention is shown. Breather 12 includes a standpipe 18, an open ended bowl 20 and an open ended shroud 22. The bowl 20 is connected to, and encircles, the standpipe 18. The shroud 22 is connected to the standpipe 18 and encircles both the standpipe and the bowl 20. In this embodiment, the standpipe 18, the bowl 20 and the shroud 22 are all made of stainless steel.

The standpipe 18 is a unitary member comprising a first end 30, a second end 32 and an intermediate portion 34 integrally connected with and extending between the first and second ends of the standpipe. The first end 30 of the standpipe 18 comprises a hollow threaded region 36 adapted for engagement with the transmission 10. The threaded region 36 is defined by cylindrical inner surface 37 and a threaded outer surface 38. In a preferred embodiment, the threaded region 36 of the standpipe 18 is adapted for engagement with the shift bar housing 16 of the transmission 10 via a ⅜ inch tapered pipe thread, such as a ⅜-18 NPTF-1 thread.

As best illustrated in FIG. 4, the second end 32 of the standpipe 18 comprises an essentially solid head portion 40. The head portion 40 includes an essentially planar top surface 42, an essentially planar bottom surface 44, parallel to and spaced apart from the top surface, and at least one side surface 46 extending between and connecting the top and bottom surfaces 42 and 44. The at least one side surface 46 is capable of transmitting torque to the standpipe 18 to facilitate installation and removal of breather 12 from transmission 10, and in the preferred embodiment, comprises at least one planar surface, and most preferably six planar surfaces of equal length. It is also contemplated that either in addition to, or instead of, the at least one side surface capable of transmitting torque to the standpipe 18, the top surface 42 of the head portion could have planar axially extending surfaces (in a radially extending groove, for example), which would compliment the surfaces of a screw-driver head, for transmitting torque to the standpipe 18. The solid head portion 40 and the at least one side surface 46 of the standpipe 18 enable a top driven installation of the breather 12 onto the transmission 10 using a socket wrench or the like.

The intermediate portion 34 is defined in part by a cylindrical outer surface 50 and comprises a solid portion 52, which is adjacent to the head portion 40 of the standpipe 18, and a cylindrical portion 54, which is adjacent to the threaded region 36 of the standpipe. The cylindrical portion 54 of the intermediate portion 34 includes a cylindrical inner surface 56 which is concentric with, and has the same diameter as, the inner surface 37. The inner surfaces 37 and 56 of the intermediate portion 34 cooperate to define an axially extending central passage 60 through the standpipe 18. The intermediate portion 34 includes at least one radially extending cylindrical surface 62, and preferably two as shown in FIG. 4, extending between and connecting inner surface 56 and outer surface 50, to define at least one radially extending passage 64.

The bowl 20 includes a radially extending annular portion 70 which is connected to the outer surface 50 of the standpipe 18 at the intermediate portion 34, between the threaded region 36 and the at least one radially extending passage 62. The bowl 20 is connected to the standpipe 18 by any suitable means, such as welding or crimping. The bowl 20 further includes an essentially cylindrical portion 72 which extends axially in a first direction from the annular portion 70 to an outwardly flanged portion 74 and terminates in a rim 76. The rim 76 defines the open end of the bowl 20. The bowl 20 and the standpipe 18 cooperate to form an annular cavity 77.

The flanged portion 74 includes at least one aperture 80 which allows for pressure equalization between the interior and exterior of transmission 10. Preferably, breather 12 includes a sufficient number of apertures 80 to provide a minimum flow rate of ten (10) standard cubic feet per minute at a nominal pressure differential of five (5) pounds per square inch (psi) when utilized with a filter as described in greater detail below. In a preferred embodiment, breather 12 includes six (6) apertures 80, in the shape of a semi-circle, equally spaced about the bowl 20 on the flanged portion 74, as best shown in FIGS. 3 and 4.

The shroud 22 includes a radially extending annular portion 84 which is connected to the outer surface 50 of the standpipe 18 just below the head portion 40 at the intermediate portion 34, as best shown in FIG. 4. The shroud 22 is connected to the standpipe 18 by any suitable means, such as welding or crimping. The shroud 22 further includes an essentially cylindrical portion 86 which extends axially in a second direction, opposite the first direction, from the annular portion 84 and terminates in a rim 88. The rim 88 defines the open end of the shroud 22. The cylindrical portion 86 has a diameter larger than the diameter of any portion of the bowl 20 so that the shroud circumscribes the bowl. The axial length of the cylindrical portion 86 is essentially the same as the axial length of the bowl 20 so that the cylindrical portion 86 spans the entire length of the bowl as best shown in FIG. 4.

A filter 90 fills the annular cavity 77 between the standpipe 18 and the bowl 20. The material chosen for the filter 90 may be any of a number of suitable materials which withstand the operating temperature range of the transmission 10. The material for the filter 90 should be selected so as to reduce or eliminate the escape of fluid mist or vapor from the transmission 10. Furthermore, filter 90 should condense or coalesce the fluid mist for return to the transmission 10. An aluminum mesh filter or a polyester filter would be suitable for many applications.

With continuing reference to FIG. 4, in a preferred embodiment, the filter 90 utilizes a polyester material which withstands a continuous temperature of 250° F. and has the desirable condensing and coalescing properties. The filter material should also be selected in conjunction with appropriate sizing of the at least one aperture 80 to provide an acceptable flow rate through the breather 12. Otherwise, a substantially restricted flow through breather 12 could result in an undesirable pressure differential between the interior and exterior of the transmission 10.

As also shown in FIG. 4, two (2) flow paths are created by the construction of the breather 12. The flow paths are illustrated diagrammatically by arrows 92 and 94. A first flow path begins at arrow 92 and proceeds through the central passage 60 of standpipe 18, through the at least one radially extending passage 64 of standpipe, through filter 90, out through the at least one aperture 80 and out of the breather 12 between the bowl 20 and the shroud 22. A second flow path also begins at arrow 92 and extends through the interior of standpipe 18, through filter 90, and back through the interior of the standpipe before returning to the transmission 10 as indicated by arrow 94.

Thus, breather 12 is characterized by the standpipe 18, the bowl 20, the shroud 22 and the filter 90 which cooperate to define the first flow path indicated by arrow 92 which allows for pressure equalization while reducing or eliminating escape of fluid mist and vapor, and the second flow path indicated by arrow 94 which provides for the return of coalesced fluid to the transmission 10.

Still referring to FIG. 4, in operation, as pressure within a transmission increases (relative to the exterior atmospheric pressure), air, vapor, and fluid mist within the transmission are forced through the interior of standpipe 18 and into filter 90. The positive pressure allows air to escape through the at least one aperture 80 while capturing fluid mist and vapor within filter 90 so as to equalize the interior and exterior pressure while reducing or eliminating expulsion of fluid from the transmission 10. The filter 90 facilitates coalescing of fluid mist and vapor which returns to the transmission 10 via the flow path indicated by arrow 94.

With continuing reference to FIGS. 3 and 4, the diameters of the threaded region 36 of the standpipe 18 and the central passage 98 of the annular protrusion 96 are appropriately sized for various applications so as to resist formation of a fluid film across their surfaces. Annular protrusion 96 extends within the interior of the transmission 10 to shield breather 12 from excessive exposure to transmission fluid, i.e. splashing of fluid and the like, during normal operation. The diameter of cylindrical inner surface 97 of annular protrusion 96 is sized to resist initial bridging of a fluid film so as to avoid unnecessary fluid expulsion as described above. In the preferred embodiment, the diameter of the cylindrical inner surface 97 is approximately ½ inch which is sufficient to resist bridging for many applications. If bridging does occur and a fluid film travels upwardly within annular protrusion 96, the threaded region 36 of standpipe 18 facilitates bursting of the fluid film.

The axial relative positioning of the at least one aperture 80 and the open end of the shroud 22, while permitting the escape of air from the transmission 10 for facilitating pressure equalization between the interior and exterior of the transmission 10, enables the shroud to shield the at least one aperture to restrict the entry of external contaminants such as water, dirt and other debris into the transmission through the breather 12.

The unitary construction of the standpipe 18 with the solid head portion 40 and the solid portion 52 adjacent to the head portion results in a breather 12 which is capable of withstanding most ordinary impacts, such as downwardly directed impacts, which could occur over the lifetime of the breather. Also, while it is contemplated that most of the coalesced fluid will drip, or run, down the outer surface 50 of the standpipe 18 into the at least one radially extending passage 64 and into the central passage 60, as indicated by arrow 94, the relative positioning of the at least one radially extending passage 64 of standpipe 18 and the annular portion 70 of the bowl 20 facilitates the return of any coalesced fluid which has built up in the bowl to the transmission 10. It is also contemplated that the at least one radially extending passage 64 could decline toward the central passage 60 to facilitate the return of coalesced fluid to the transmission 10.

It is understood, of course, that while the forms of the invention herein shown and described constitute the preferred embodiments of the present invention, they are not intended to illustrate all possible forms thereof. It will also be understood that the words used are descriptive rather than limiting, and that various changes may be made without departing from the spirit or scope of the invention as claimed below.

What is claimed is:

1. An apparatus for venting a vehicular transmission containing a lubricating fluid, the apparatus comprising:

a standpipe having a first end, a second end and an intermediate portion extending axially between said first and second ends, said first end of said standpipe having a threaded region adapted for engagement with the transmission, the threaded region being of a size to resist formation of a film of the lubricating fluid thereacross, said second end of said standpipe having at least one surface for transmitting torque to said standpipe, said intermediate portion having an axially extending passage and at least one radially extending passage;

a cylinder adapted to receive a filter, the cylinder having a first end secured to said standpipe and having at least one aperture;

a shroud secured to said standpipe; and a filter disposed between said cylinder and said standpipe.

2. The apparatus of claim 1 wherein said standpipe is a unitary member.

3. The apparatus of claim 2 wherein said second end of said standpipe comprises a solid head portion having a top surface and a bottom surface, said at least one surface extending between and connecting said top and bottom surfaces.

4. The apparatus of claim 3 wherein said at least one surface comprises at least one planar surface.

5. The apparatus of claim 3 wherein said at least one surface comprises six planar surfaces.

6. The apparatus of claim 1 wherein said cylinder further includes a second portion extending axially from said first end of said cylinder in a first direction, said at least one aperture being positioned on said second portion of said cylinder, said shroud further including a second portion extending axially from said first end of said shroud in a second direction, opposite the first direction.

7. The apparatus of claim 6 wherein said shroud circumscribes said cylinder and wherein said second portion of said shroud has an axial length sufficient to extend axially along at least the entire axial length of said at least one aperture of said cylinder.

8. The apparatus of claim 7 wherein said second portion of said shroud has an axial length sufficient to extend axially along the entire axial length of said cylinder.

9. The apparatus of claim 1 wherein said intermediate portion of said standpipe comprises a solid portion adjacent to said second end.

10. The apparatus of claim 9 wherein said axially extending passage of said intermediate portion of said standpipe is adjacent to said threaded region, said threaded region having an axially extending passage in fluid communication with said axially extending passage of said intermediate portion.

11. The apparatus of claim 9 wherein at least one of said standpipe, said cylinder and said shroud are made of stainless steel.

12. A system for venting a vehicular transmission containing a lubricating fluid so as to allow pressure equalization within and without the transmission while reducing expulsion of the lubricating fluid therefrom, the system comprising:

a housing adapted for mounting to the transmission, the housing having an annular protrusion having an interior threaded region and an inside diameter sized to resist formation of a film of the lubrication fluid thereacross;

a standpipe having a first end, a second end and an intermediate portion extending axially between said first and second ends, said first end of said standpipe having a threaded region adapted for engagement with said interior threaded region of said housing, said second end of said standpipe having at least one surface for transmitting torque to said standpipe, said intermediate portion having an axially extending passage and at least one radially extending passage;

a cylinder adapted to receive a filter, the cylinder having a first end secured to said standpipe and having at least one aperture;

a shroud secured to said standpipe; and a filter disposed between said cylinder and said standpipe.

13. The system of claim 12 wherein said standpipe is a unitary member and said second end of said standpipe comprises a solid head portion having a top surface and a bottom surface, said at least one surface extending between and connecting said top and bottom surfaces.

14. The system of claim 13 wherein said at least one surface comprises six planar surfaces.

15. The system of claim 12 wherein said cylinder further includes a second portion extending axially from said first end of said cylinder in a first direction, said at least one aperture being positioned on said second portion of said cylinder, said shroud further including a second portion extending axially from said first end of said shroud in a second direction, opposite the first direction.

16. The system of claim 15 wherein said shroud circumscribes said cylinder and wherein said second portion of said shroud has an axial length sufficient to extend axially along at least the entire axial length of said at least one aperture of said cylinder.

17. The system of claim 12 wherein said intermediate portion of said standpipe comprises a solid portion adjacent to said second end and said axially extending passage of said intermediate portion of said standpipe is adjacent to said threaded region, said threaded region having an axially extending passage in fluid communication with said axially extending passage of said intermediate portion.

18. The system of claim 12 wherein at least one of said standpipe, said cylinder and said shroud are made of stainless steel.

19. An apparatus for venting a vehicular transmission containing a lubricating fluid, the apparatus consisting essentially of:

a standpipe having a first end, a second end and an intermediate portion extending axially between said first and second ends, said first end of said standpipe having a threaded region adapted for threaded engagement with the transmission, the threaded region being of a size to resist formation of a film of the lubricating fluid thereacross, said second end of said standpipe having at least one surface for transmitting torque to said standpipe, said intermediate portion having an axially extending passage and at least one radially extending passage;

a cylinder adapted to receive a filter, the cylinder having a first end secured to said standpipe and having at least one aperture;

a shroud secured to said standpipe; and a filter disposed between said cylinder and said standpipe.

* * * * *